Jan. 25, 1927.
T. D. CLARK
1,615,570
AUTOMOBILE TIRE CHAIN
Filed Sept. 28, 1926
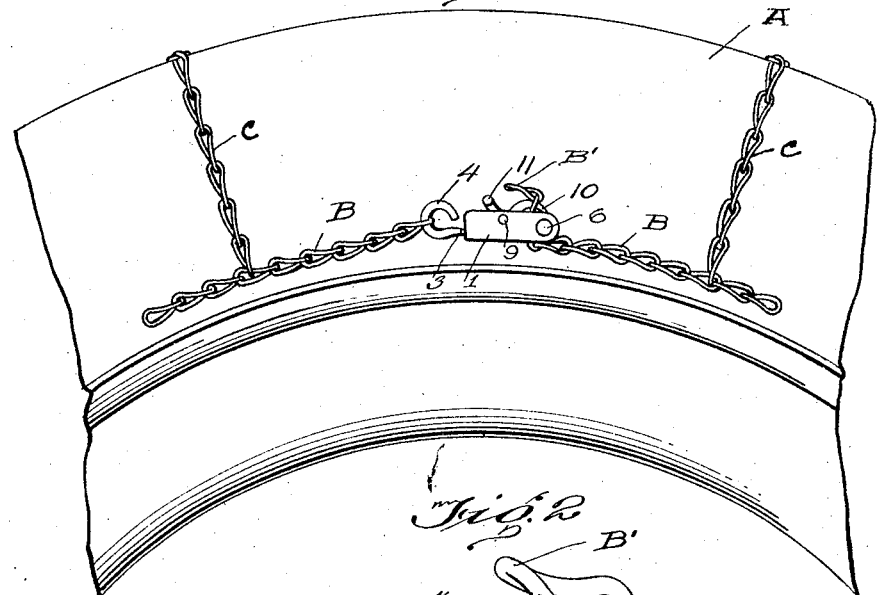
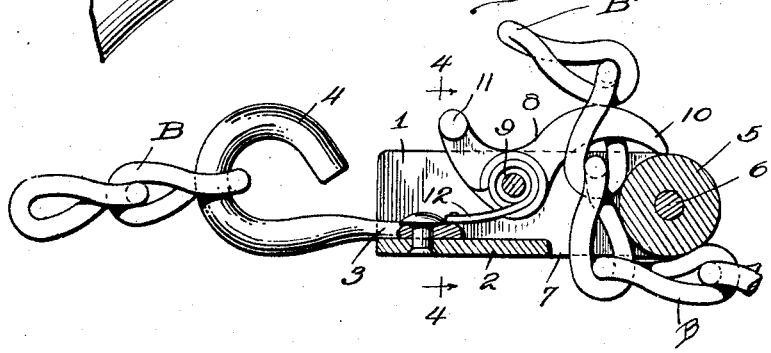
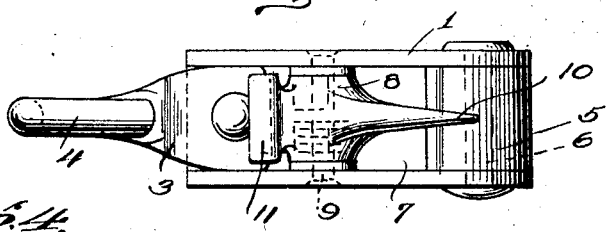
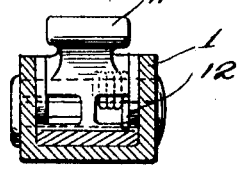
Inventor
Theodore D. Clark
By O'Neill & Bunn
Attorneys Patented Jan. 25, 1927.

1,615,570

UNITED STATES PATENT OFFICE.

THEODORE D. CLARK, OF QUIMBY, IOWA.

AUTOMOBILE TIRE CHAIN.

Application filed September 28, 1926. Serial No. 138,269.

This invention relates to connectors for automobile tire chains, and has for its primary object the provision of a connector which greatly facilitates the operation of attaching a chain to a tire, or detaching it from the tire.

In most of the present day non-skid chains for automobiles, the two portions of the chain which extend around the tire and parallel to and adjacent the bead thereof, are equipped at one end with a foldable fastener element adapted to extend through a link of the chain, and to be thereafter folded upon and within itself to grip and hold the end of the chain in position. Every user of an automobile is aware of the fact that such fasteners, while relatively easy to apply at the first installation, soon become rusty, and that all subsequent efforts to apply the chains to the tire, or to remove them therefrom, are very difficult operations which generally require the use of a tool to open the fastener and which at best, always results in soiled hands for the operator. Moreover, in all adjustments of the chain to take up the slack therein, the fasteners must be opened. Another object of the invention therefore, is the provision of fastener elements which will permit of adjustment of the chain to take up the slack therein, by merely pulling on the free end of the chain after it has already been engaged with the fastener element, and which cannot become accidently unlocked on any kind of road.

Other objects of the invention will be made apparent in the following specifications, when taken in connection with the accompanying drawings forming a part thereof.

In said drawings;

Fig. 1 is a fragmentary plan view, showing the side of a tire, and a chain equipped with a device embodying my invention.

Fig. 2 is a side elevation of my connector, partly in section.

Fig. 3 is a top plan view of the connector, and,

Fig. 4 is a section taken on the line 4—4 of Fig. 2.

Now referring specifically to the drawings, in which like reference numerals or characters indicate like parts throughout the several views, A is the automobile tire, equipped with chains comprising longitudinally extending members B, on each side, and cross-links C, connecting the members B, as will be understood.

My chain connector comprises a metallic body portion 1 in the form of a channel iron, and provided at its front end with a floor portion 2, to which is bolted or riveted the shank 3 of a hook 4, adapted to engage the end link of the chain B. At the rear end of the body 1 an anti-friction roller 5 is mounted on trunnions 6, extending through the side walls of the body, as clearly shown in Figs. 2 and 3, the diameter of the roller 5 being substantially the same as the height of said side walls.

The floor 2 terminates at a point short of the front periphery of the roller 5, leaving an opening 7 for the insertion of the free end B' of the chain B. Pivotally mounted, on trunnions 9, extending between the side walls of the body 1, and substantially midway between the front end of said body, and the rear periphery of the roller 5, is a pawl 8, best shown in Fig. 2. The pawl is provided with an arm which extends upwardly above the pivot point, terminating in a downwardly-curved rear end 10, normally adapted to rest upon or immediately adjacent the top periphery of the roller 5. The front end of the pawl also extends upwardly beyond the side walls of the body 1, and terminates in a laterally elongated presser foot 11. A coiled spring 12 is secured to a stationary part of the body 1, and, surrounding the trunnion 9, is secured at its other end to the pawl 8. The tendency of the spring 12 at all times is to press the point 10 downwardly towards the roller 5.

With the elements assembled as described, the chain is applied by being first draped upon the tire in the well known manner. The free end B' of the chain is then passed under the roller 5 and upwardly through the opening 7, and thence backwardly over the said roller. The left thumb of the operator then presses upon the foot 11, thereby raising the end 10 from off the roller 5, and one link of the chain passed over the end 10 of the pawl 8, and the pressure upon the foot 11 is then removed to permit the end 10 to again move towards the roller 5 under the influence of the spring, the device then being in the position shown in Fig. 2. In order to take up any slack in the chain, the free end B' is pulled upwardly and, preferably, rearwardly. This movement raises the end 10 from its position adjacent the roller 5, and the next lower link of the chain is passed over the end 10, the spring 12 again restoring the pawl to the position shown in Fig. 2. In these operations the chain engages the periphery of the roller 5 thereby facilitating the operation as said roller rotates under the drag of the chain.

When the chain needs tightening under running conditions, all that is necessary is for the operator to grasp the free end B' with a pair of pliers and exert a rearward pull, and insert the end 10 in the next adjacent link, which operation may be easily effected without contact of the connector by the hands of the operator. Obviously the chains are as easily removed by an operation the reverse of that herein described.

From the foregoing it will be apparent that I have provided a connector which greatly facilitates the operation of attaching a chain to the tire or detaching it therefrom, or of adjusting any slack in the chain by a pull thereon and automatically locking the chain in its adjusted position.

Modifications of the structure herein described will be suggested to those skilled in the art, but my invention covers all embodiments falling fairly within the scope of the appended claims.

What I claim is:

1. A chain connector for automobile tire chains comprising a body portion, a roller carried thereby, a pawl pivotally mounted on said body portion and having an arm terminating adjacent said roller, and a spring engaging said pawl and constantly pressing the end of said arm towards said roller.

2. A chain connector for automobile tire chains comprising a body portion, a roller carried thereby, a pawl pivotally mounted on said body portion and having a rearwardly extending arm terminating adjacent said roller, a presser foot on the front end of said arm, and a spring connected to said pawl and normally tending to press the end of said arm towards said roller.

In testimony whereof I affix my signature.

THEODORE D. CLARK.